(12) United States Patent
Konno et al.

(10) Patent No.: US 10,998,560 B2
(45) Date of Patent: May 4, 2021

(54) FUEL CELL STACK (71) Applicant: TOYOTA JIDOSHA KABUSHIKI KAISHA, Toyota (JP)

(72) Inventors: Norishige Konno, Toyota (JP); Hiroki Okabe, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 95 days.

(21) Appl. No.: 16/371,876

(22) Filed: Apr. 1, 2019

(65) Prior Publication Data
US 2019/0229353 A1 Jul. 25, 2019

Related U.S. Application Data (62) Division of application No. 15/950,652, filed on Apr. 11, 2018, now abandoned, which is a division of application No. 14/936,491, filed on Nov. 9, 2015, now abandoned.

(30) Foreign Application Priority Data

Nov. 10, 2014 (JP) ................. 2014-228191

(51) Int. Cl.
H01M 8/241 (2016.01)
H01M 8/2483 (2016.01)
H01M 8/04007 (2016.01)
H01M 8/04701 (2016.01)
H01M 8/1018 (2016.01)

(52) U.S. Cl.
CPC ... *H01M 8/04067* (2013.01); *H01M 8/04731* (2013.01); *H01M 8/241* (2013.01); *H01M 8/2483* (2016.02); *H01M 2008/1095* (2013.01)

(58) Field of Classification Search
CPC .......... H01M 8/04067; H01M 8/2483; H01M 8/04731; H01M 8/241; H01M 2008/1095
See application file for complete search history.

(56) References Cited

U.S. PATENT DOCUMENTS

| 2003/0215693 | A1 | 11/2003 | Asai et al. | |
| 2004/0157099 | A1 | 8/2004 | Kato et al. | |
| 2006/0110649 | A1* | 5/2006 | Nishiyama | H01M 8/241 429/457 |
| 2009/0325016 | A1 | 12/2009 | Yamashita et al. | |

(Continued)

FOREIGN PATENT DOCUMENTS

| CN | 103178285 A | 6/2013 |
| DE | 10322537 A1 | 1/2004 |

(Continued)

OTHER PUBLICATIONS

U.S. Appl. No. 14/936,491, filed Nov. 9, 2015.

(Continued)

*Primary Examiner* — Osei K Amponsah
(74) *Attorney, Agent, or Firm* — Finnegan, Henderson, Farabow, Garrett & Dunner, LLP (57) ABSTRACT A fuel cell stack 11 includes a cell laminate 21 composed of a plurality of stacked cells 20, and air is introduced from an anode end part 21a of the cell laminate 21. The cell laminate 21 has two end cells 24 installed adjacently to a cathode end part 21b side, thereby providing the cathode end part 21b with high thermal insulation properties.

2 Claims, 6 Drawing Sheets (56) References Cited

U.S. PATENT DOCUMENTS

2013/0164646 A1* 6/2013 Kobayashi ............ H01M 8/241
　　　　　　　　　　　　　　　　　　　　429/434
2015/0118587 A1　 4/2015　Heo

FOREIGN PATENT DOCUMENTS

| JP | 2003-338305 | A | 11/2003 |
|----|-------------|---|---------|
| JP | 2007-048484 | A | 2/2007 |
| JP | 2009-158349 |   | 7/2009 |
| JP | 2010-123441 | A | 6/2010 |
| JP | 2010-244946 |   | 10/2010 |
| JP | 2011-249010 | A | 12/2011 |
| JP | 2013-120626 | A | 6/2013 |
| JP | 2013-149595 | A | 8/2013 |

OTHER PUBLICATIONS

U.S. Appl. No. 15/950,652, filed Apr. 11, 2018.
Office Action issued in U.S. Appl. No. 14/936,491 dated May 23, 2017.
Final Office Action issued in U.S. Appl. No. 14/936,491 dated Dec. 12, 2017.
Advisory Action issued in U.S. Appl. No. 14/936,491 dated Mar. 1, 2018.
Office Action issued in U.S. Appl. No. 15/950,652 dated Jan. 28, 2019.

\* cited by examiner

FUEL CELL STACK

This is a divisional of U.S. application Ser. No. 15/950,652, filed on Apr. 11, 2018, which is a divisional of U.S. application Ser. No. 14/936,491, filed on Nov. 9, 2015, which claims priority based on Japanese Patent Application No. 2014-228191, filed on Nov. 10, 2014, the disclosure of each of which is incorporated herein in its entirety.

BACKGROUND OF THE INVENTION

Field of the Invention

The present invention relates to a fuel cell stack constituting a fuel cell.

Background Art

A fuel cell stack includes a cell laminate composed of a plurality of stacked cells. Each cell of the cell laminate generates power from the electrochemical reaction between a hydrogen gas and the oxygen contained in air when the hydrogen gas and the air are supplied from one end of the cell laminate (refer to, for example, Patent Document 1).

CITATION LIST

Patent Document(s)

[Patent Document 1] JP2009-158349A

A cell located on a far side from an oxygen gas inlet, through which air containing an oxygen gas is introduced into a cell laminate, receives less oxygen gas due to a pressure loss than a cell located adjacent to the oxygen gas inlet. Further, the cells at both ends of the cell laminate radiate heat more easily than the cells at a central part of the cell laminate and therefore more easily cool, causing water, which is produced during power generation, to be apt to remain in the cells. For this reason, especially in a cell on the far side from the oxygen gas inlet, at which the volume of the oxygen gas reduces due to the pressure loss, the water produced during the power generation blocks the flow of the oxygen gas in a flow path. This may lead to the shortage of the oxygen gas, resulting in deteriorated efficiency of power generation.

SUMMARY OF THE INVENTION

The present invention has been made in view of the background described above, and an object of the invention is to provide a fuel cell stack capable of suppressing a temperature difference in a cell laminate thereby to achieve higher efficiency of power generation.

To this end, a fuel cell stack in accordance with the present invention is a fuel cell stack including: a cell laminate composed of a plurality of stacked cells,
wherein an oxygen gas is introduced from a gas introduction end part on one side of the cell laminate, and
the cell laminate has relatively higher thermal insulation properties at least at an end part on a far side from the gas introduction end part than at an end part closer thereto.

According to the fuel cell stack configured as described above, the thermal insulation properties at the end part on the far side from the gas introduction end part are set to be relatively higher than the thermal insulation properties at the end part closer thereto. This makes it possible to prevent the relative decrease in the temperature of the cell at the end part on the far side, thus preventing the volume of water, which is generated by the gas and which is carried away, from becoming smaller than those of the other cells. Thus, it is possible to control the volume of the generated water that remains in the cell at the end part on the far side from the gas introduction end part of the cell laminate.

With this arrangement, the blockage of the oxygen gas flow caused by the generated water can be suppressed, and therefore, the shortage of the oxygen gas at the cell on the far side from the gas introduction end part can be restrained. Hence, variations in the supply of the oxygen gas in the cell laminate can be restrained, permitting higher efficiency of power generation.

In the fuel cell stack in accordance with the present invention, the cell laminate may include a non-power-generating end cell which has thermal insulation properties that are higher than those of other cells and which is located at least at the end part on the far side from the gas introduction end part.

According to the fuel cell stack configured as described above, providing the end cell at the end part on the far side from the gas introduction end part in the cell laminate restrains the radiation of heat at the end part on the far side from the gas introduction end part, resulting in higher thermal insulation properties. This suppresses the volume of the generated water remaining in the cell at the end part on the far side from the gas introduction end part of the cell laminate thereby to restrain the blockage of the flow of the oxygen gas by the generated water, thus making it possible to restrain the shortage of the oxygen gas at the cell on the far side from the gas introduction end part.

In the fuel cell stack in accordance with the present invention, the cell laminate may have the end cells at both ends thereof, and a greater number of the end cells may be provided at the end part on the far side from the gas introduction end part than the number of the end cells provided at the gas introduction end part.

According to the fuel cell stack configured as described above, the end cells provided at the gas introduction end part and at the end part on the far side from the gas introduction end part in the cell laminate restrain the radiation of heat at the gas introduction end part and at the end part on the far side from the gas introduction end part, resulting in higher thermal insulation properties. This makes it possible to suppress the volume of the generated water remaining in the cell at the gas introduction end part and at the end part on the far side from the gas introduction end part of the cell laminate, thereby restraining the blockage of the flow of the oxygen gas by the generated water and therefore restraining the shortage of the oxygen gas.

Furthermore, the thermal insulation properties at the end part on the far side from the gas introduction end part, at which there are more end cells, are higher than those at the gas introduction end part. This makes it possible to suppress the volume of the generated water remaining especially in the cell at the end part on the far side from the gas introduction end part of the cell laminate, thereby restraining the blockage of the flow of the oxygen gas by the generated water and therefore restraining the shortage of the oxygen gas. Further, the operational advantages described above are achieved by the end cells, which are common parts, so that an increase in cost or size can be restrained, as compared with the case where a heater, a cooling component or the like is used to achieve the same operational advantages.

The fuel cell stack in accordance with the present invention permits higher efficiency of power generation by suppressing a temperature difference in a cell laminate.

DESCRIPTION OF THE PREFERRED EMBODIMENTS

The following will describe an embodiment of a fuel cell stack in accordance with the present invention with reference to the accompanying drawings.

Figure 1:
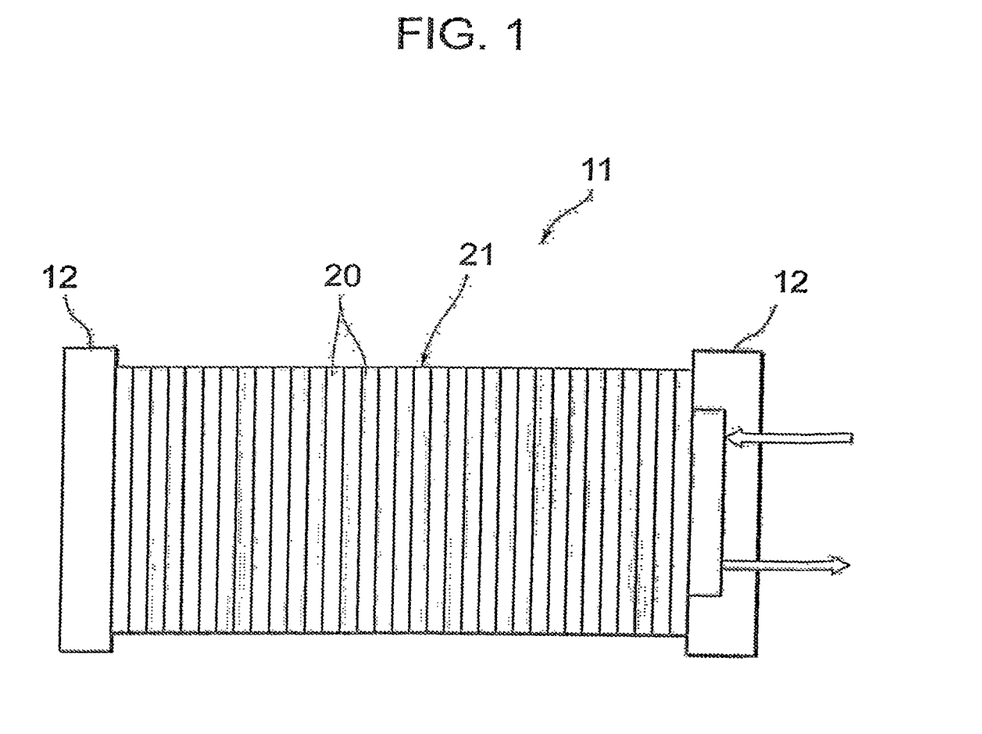
FIG. 1 is a side view of a fuel cell according to a present embodiment.
Figure 2:
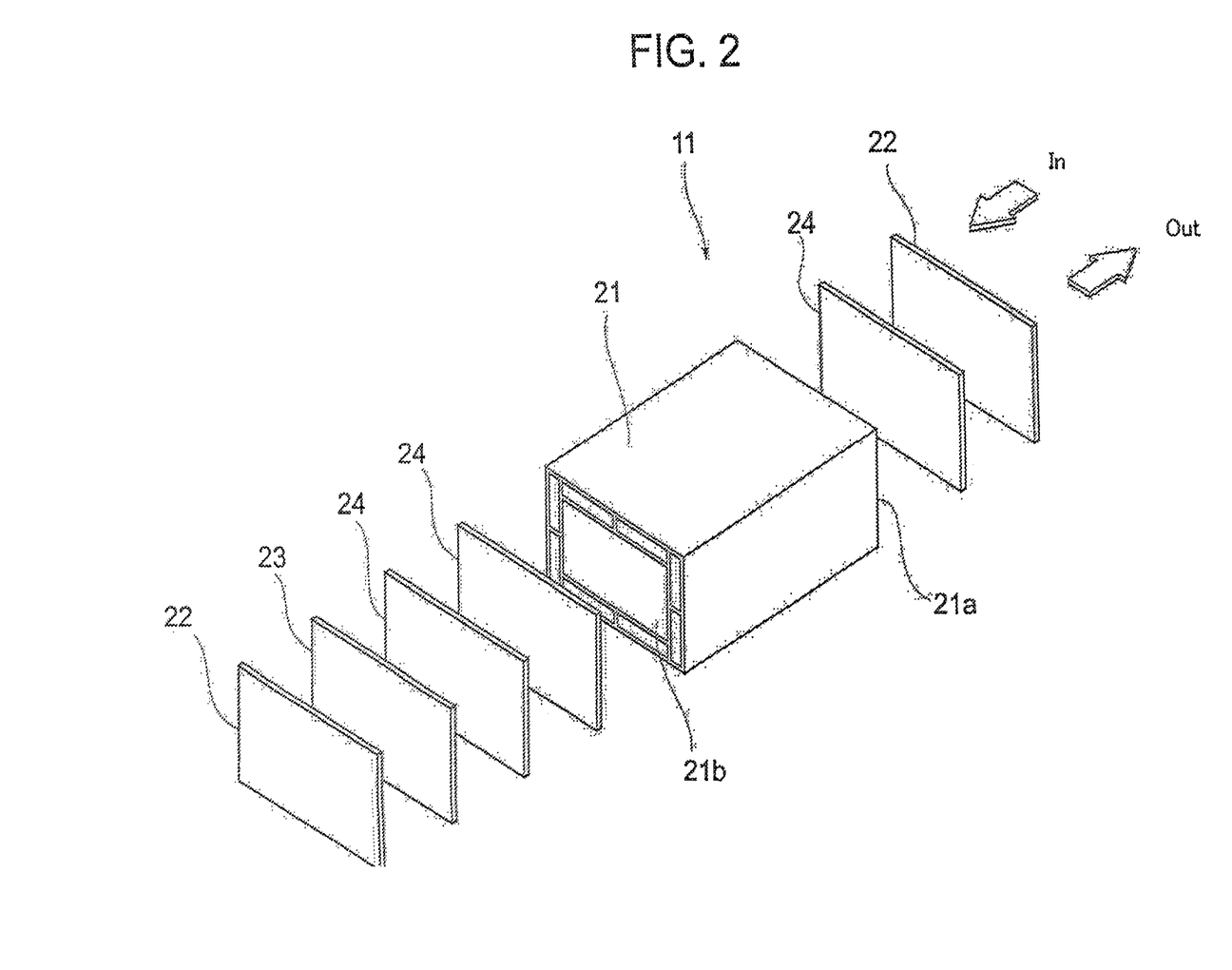
FIG. 2 is a schematic exploded perspective view of a fuel cell stack constituting the fuel cell according to the present embodiment.
Figure 3:
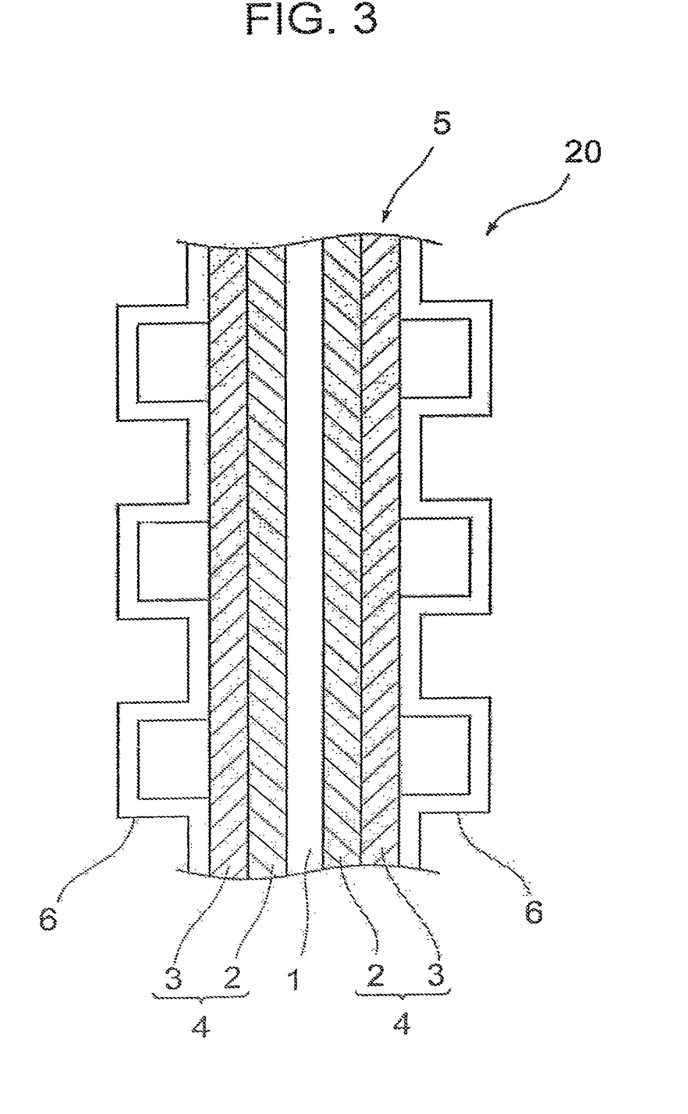
FIG. 3 is a sectional view of a cell constituting a cell laminate of the fuel cell stack.

FIG. 1 is a side view of a fuel cell according to the present embodiment. FIG. 2 is a schematic exploded perspective view of a fuel cell stack constituting the fuel cell according to the present embodiment. FIG. 3 is a sectional view of a cell constituting a cell laminate of the fuel cell stack.

As illustrated in FIG. 1, a fuel cell stack 11 according to the present embodiment has end plates 12 at both ends thereof. The end plates 12 are connected with each other by being fastened by a fastening rod (not illustrated). The fuel cell stack 11 is pressurized under a predetermined load from both ends by the fastening force of the end plates 12. The fuel cell stack 11 constitutes a fuel cell used by being installed in a mobile body, such as a vehicle.

As illustrated in FIG. 2, the fuel cell stack 11 has a cell laminate 21, current-collecting plates 22, and a rust-proof plate 23. The cell laminate 21 is formed by stacking a plurality of cells 20, and end cells 24 are provided on both ends thereof. The cell laminate 21 has one end serving as a gas introduction end part and the other end serving as a gas return end part.

As illustrated in FIG. 3, each of the cells 20 has a membrane electrode assembly (hereinafter referred to as "the MEA") 5, which includes electrodes 4 provided on both sides of an electrolyte film 1, each of the electrodes 4 being composed of a catalyst layer 2 and a diffusion layer 3. Separators 6 are provided on both surfaces of the MEA 5. The separators 6 are formed of stainless plates. Each of the cells 20, which is a unit module generating power in the fuel cell stack 11, generates power by the electrochemical reaction between a hydrogen gas and the oxygen contained in the air.

Each of the current-collecting plates 22 is formed of an electrically conductive metal material, such as aluminum or stainless steel. The current-collecting plates 22 are provided with output terminals (not illustrated), and the electric power generated by the fuel cell stack 11 is taken out through the output terminals. The current-collecting plate 22 adjacent to the gas introduction end part of the cell laminate 21 is defined as the electrode on the anode side, while the current-collecting plate 22 adjacent to the gas return end part of the cell laminate 21 is defined as the electrode on the cathode side. In other words, the cell laminate 21 has the gas introduction end part serving as an anode (An) end part 21a and the gas return end part serving as a cathode (Ca) end part 21b. The rust-proof plate 23 is provided between the cell laminate 21 and the current-collecting plate 22 on the cathode end part 21b side of the cell laminate 21.

Air containing the oxygen gas is supplied to the cell laminate 21 from the anode end part 21a, which is the gas introduction end part. The air supplied from the anode end part 21a turns around at the cathode end part 21b, which is the gas return end part, and is exhausted from the anode end part 21a. This passes the air through each of the cells 20. As with the air, the hydrogen gas is supplied from the anode end part 21a of the cell laminate 21, turns around at the cathode end part 21b, and is exhausted from the anode end part 21a. Thus, in the cell laminate 21, each of the cells 20 generates electric power by the electrochemical reaction between hydrogen gas and the oxygen contained in the air.

The both ends of the cell laminate 21, namely, the anode end part 21a and the cathode end part 21b, are provided with the end cells 24. The anode end part 21a has one of the end cells 24, while the cathode end part 21b has two of the end cells 24. The end cells 24 have the same configuration, which is similar to the configuration of the cells 20. For example, the end cell 24 does not have the electrolyte film, but has the assembly in which the catalyst layer and the diffusion layer are bonded, and both surfaces of the assembly are provided with separators similar to the separators 6 of the cells 20.

Each of the end cells 24 is a non-power-generating cell configured as described above.

Providing the anode end part 21a and the cathode end part 21b of the cell laminate 21 with the end cells 24 causes the hydrogen gas, air and cooling water, which are supplied to the cell laminate 21, to pass through the flow paths in the end cells 24. At this time, even when the air and the hydrogen gas are supplied, the oxygen gas in the air and the hydrogen gas do not contribute to power generation and bypass the end cells 24 without being consumed. Meanwhile, the thermal capacity of cooling water is high, and the cooling water flowing through the end cells 24 causes the thermal capacity of the entire end cells 24 to become relatively high, so that the thermal insulation properties thereof become relatively higher than those of the cells 20. This suppresses or shuts off the radiation of heat to the outside from the cells 20 adjacent to the end cells 24.

Figure 4A:
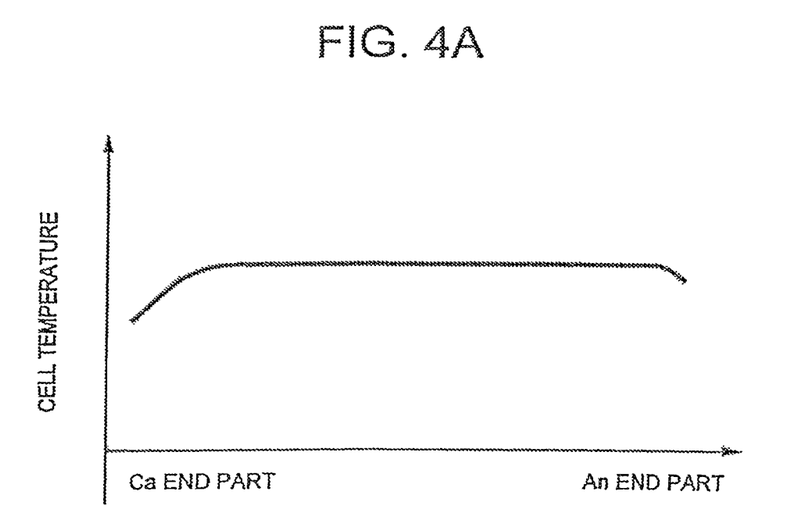
FIGS. 4A and 4B present graphs illustrating the moisture content and the cell temperature in a cell laminate without any end cells.
Figure 4B:
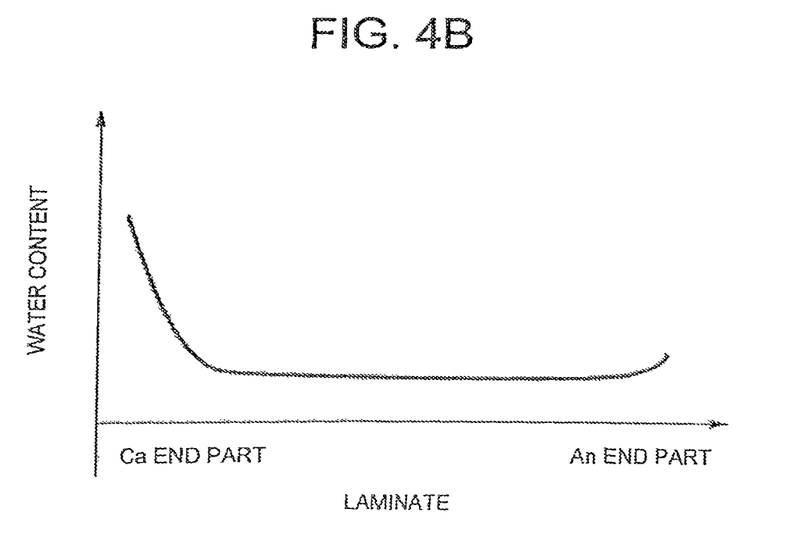

As illustrated in FIGS. 4A and 4B, generally, in a fuel cell stack configured to distribute a gas from the anode end part 21a of the cell laminate 21, the cathode end part 21b of the cell laminate 21 is influenced by heat radiation and the cell temperature tends to become lower than that at the central part or the anode end part 21a throughout power generation and discharge, leading to the occurrence of a temperature difference ΔT from the central part. As a result, especially when the load is low at the time of idling or the like in a low temperature environment, the volume of water generated by the power generation which is contained in the air increases in the flow path at the cathode end part 21b, thus frequently blocking the air flow. In addition, the flow quantity of the air is reduced due to the pressure loss at the cathode end part 21b, as compared with the anode end part 21a. This may lead to an air distribution failure at the cathode end part 21b in the cell laminate 21.

As the preventive measures, therefore, the fuel cell stack 11 according to the present embodiment includes the two end cells 24 installed adjacently to the cathode end part 21b on the far side from the anode end part 21a, which is the gas introduction end part. This makes it possible to enhance the thermal insulation properties of the cathode end part 21b of the cell laminate 21. Thus, the temperature difference ΔT of the cathode end part 21b from the central part of the cell laminate 21 can be minimized, making it possible to suppress the volume of the generated water at the cathode end part 21b of the cell laminate 21 so as to suppress the blockage of the air flow by the generated water, thereby restraining the shortage of the oxygen gas at the cathode end part 21b.

Further, a decrease in the flow quantity of the air due to the pressure loss does not take place at the anode end part 21a, which is the gas introduction end part of the cell laminate 21. However, as with the cathode end part 21b, the anode end part 21a tends to radiate heat and therefore, the cell temperature thereof tends to become lower than that at the central part. Hence, the present embodiment has the single end cell 24 located adjacently to the anode end part 21a so as to enhance the thermal insulation properties of the anode end part 21a of the cell laminate 21, thus making it possible to minimize the temperature difference ΔT of the anode end part 21a from the central part in the cell laminate 21. With this arrangement, the volume of the generated water at the anode end part 21a of the cell laminate 21 can be suppressed so as to suppress the blockage of the air flow by the generated water, thereby restraining the shortage of the oxygen gas at the anode end part 21a.

Figure 5:
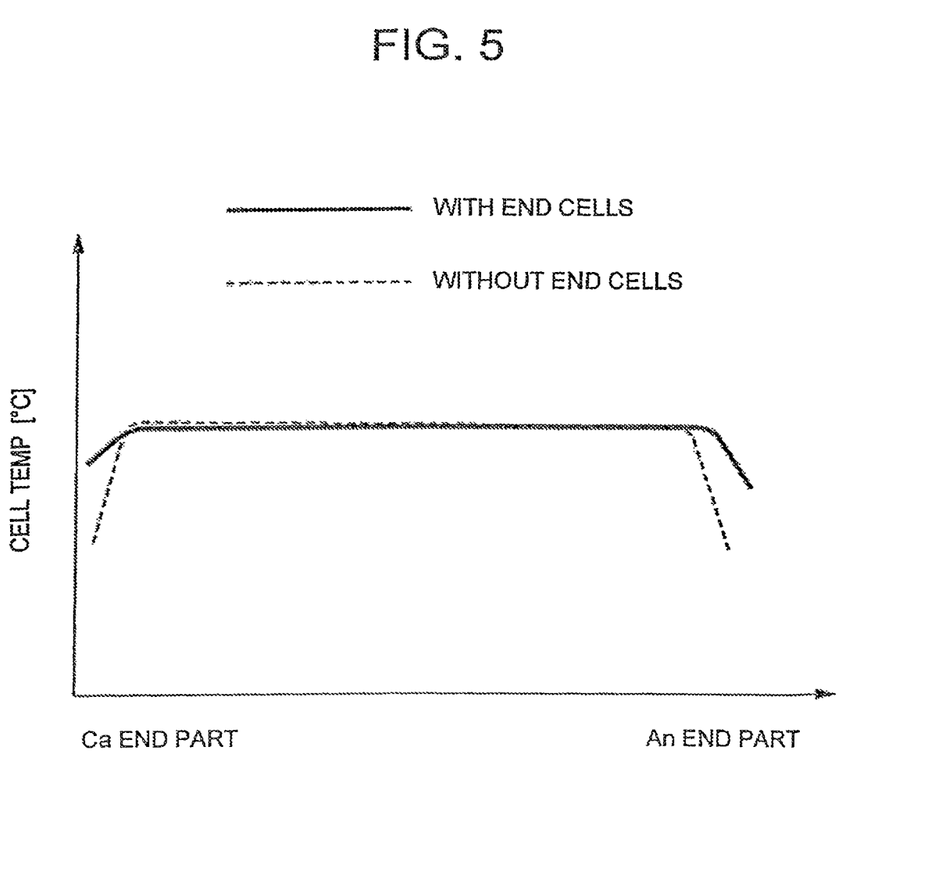
FIG. 5 is a graph illustrating the cell temperature in the cell laminate.

As illustrated in FIG. 5, providing the single end cell 24 adjacently to the anode end part 21a and the two end cells 24 adjacently to the cathode end part 21b as in the present embodiment makes it possible to suppress a decrease in the cell temperature at both ends (the temperature indicated by the solid line in FIG. 5) in contrast to the case where the end cells 24 are not provided and the cell temperature decreases at both ends (the temperature indicated by the dashed line in FIG. 5).

As described above, the fuel cell stack 11 according to the present embodiment makes it possible to maximize the suppression of the temperature difference ΔT of the cell temperature in the cell laminate 21 by providing the anode end part 21a and the cathode end part 21b of the cell laminate 21 with the end cells 24 without using any special heat insulation members or the like. This arrangement permits smooth supply of the oxygen gas to the entire cell laminate 21 to achieve efficient power generation. Furthermore, the end cells 24, which are common parts, are used, thus making it possible to avoid an increase in cost or size caused by using a heater or a cooling component for suppressing the temperature difference ΔT of the cell temperature.

Figure 6:
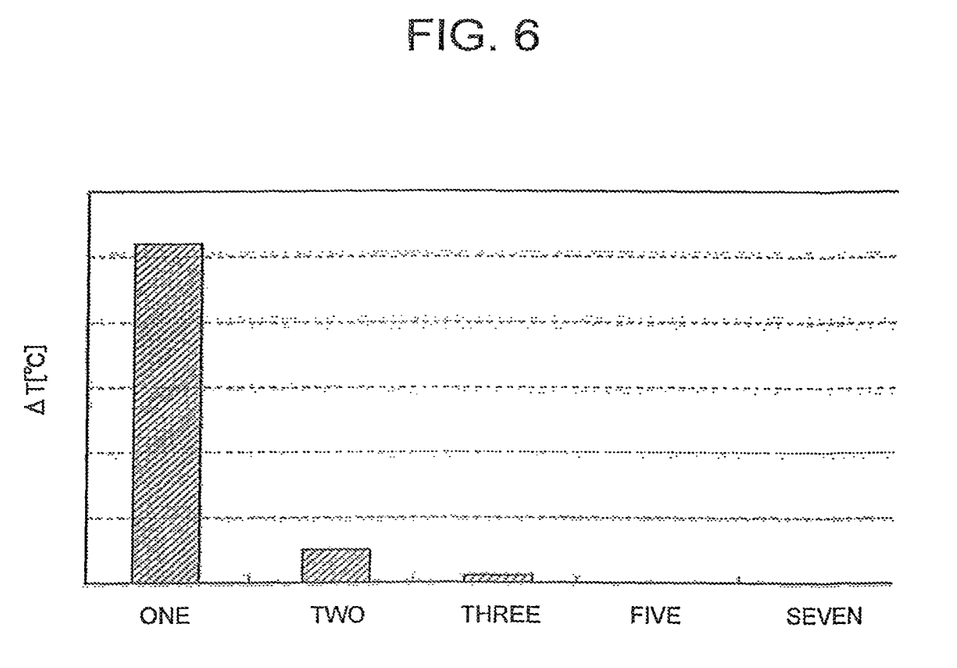
FIG. 6 is a graph illustrating the relationship between the number of the end cells and the temperature difference of a cathode end part from a central part.

The temperature difference ΔT between the cathode end part 21b and the central part was measured using several different numbers of the end cells 24 provided adjacently to the cathode end part 21b of the cell laminate 21. The measurement of the temperature difference ΔT was carried out at a cooling water temperature of 60° C., a current value of 15 A, and an outside temperature of −20° C.

As illustrated in FIG. 6, which shows the measurement results, the temperature difference ΔT is still large in the case where the single end cell 24 is provided, whereas the temperature difference ΔT can be markedly reduced by providing the two end cells 24. Theoretically, it is ideal to eliminate the temperature difference ΔT to prevent the air distribution failure. It has been found, however, installing the two end cells 24 is effective for nearly eliminating the air distribution failure. Further, adding more of the end cells 24 (three, five and seven) permits a reduction in the temperature difference ΔT, but results in an inconvenient increase in the size of the cell laminate 21.

Based on the measurement results, it has been concluded that providing two of the end cells 24 is appropriate for achieving a sufficiently reduced temperature difference ΔT while restraining the cell laminate 21 from becoming larger.

The number of the end cells 24 to be provided at the anode end part 21a and the cathode end part 21b of the cell laminate 21 is not limited to that in the foregoing embodiment, and is to be selected according to a required reduction in the temperature difference ΔT between the anode end part 21a and the cathode end part 21b and the central part of the cell laminate 21. For example, the number of the end cells 24 to be provided at the anode end part 21a and the cathode end part 21b of the cell laminate 21 is preferably changed, as necessary, according to the shape or the material of the cell laminate 21, the position of the flow path of a gas or cooling water, the environment in which the fuel cell stack 11 housed in a case or the like is installed, or the like.

DESCRIPTION OF REFERENCE NUMERALS 11 fuel cell stack
20 cell
21 cell laminate
21a anode end part (gas introduction end part)
21b cathode end part (end part on the far side from the gas introduction end part)
24 end cell

What is claimed is:

1. A method for manufacturing a fuel cell stack including a cell laminate composed of a plurality of stacked cells, wherein an oxygen gas is introduced from a gas introduction end part at an anode end part on one side of the cell laminate, the method comprising:
    providing the cell laminate with a plurality of non-power-generating end cells which each have thermal insulation properties that are higher than those of other cells of the cell laminate,
    providing at least one of the non-power-generating end cells at both ends of the cell laminate,
    providing a greater number of the non-power-generating end cells at a cathode end part on a far side of the cell laminate from the gas introduction end part than the number of the non-power-generating end cells provided at the gas introduction end part,
    providing a rust-proof plate between the non-power-generating end cells and a current-collecting plate at the cathode end part, and
    selecting the number of non-power-generating end cells according to a temperature difference between the anode end part and the cathode end part with respect to a central part of the cell laminate.

2. The method of claim 1, wherein the number of end cells provided at the gas introduction end part is one, and the number of end cells provided at the end part on the far side of the cell laminate from the gas introduction end part is two.

* * * * *